United States Patent [19]

Schwander et al.

[11] 4,159,379

[45] Jun. 26, 1979

[54] DISPERSION DYESTUFFS OF THE NAPHTHOLACTAM SERIES

[75] Inventors: Hansrudolf Schwander, Riehen; Christian Zickendraht, Binningen, both of Switzerland

[73] Assignee: Ciba-Geigy AG, Basel, Switzerland

[21] Appl. No.: 823,367

[22] Filed: Aug. 10, 1977

[30] Foreign Application Priority Data

Aug. 17, 1976 [LU] Luxembourg .......................... 75606

[51] Int. Cl.$^2$ .................. C07D 401/06; C07D 709/92; C07D 241/44

[52] U.S. Cl. ............................. 544/354; 260/326.5 B; 260/326.27; 260/465 H; 8/1 B; 562/435; 560/21

[58] Field of Search ..................... 260/250 Q; 544/354

[56] References Cited

FOREIGN PATENT DOCUMENTS 2309612 8/1974 Fed. Rep. of Germany.

*Primary Examiner*—Mark L. Berch

*Attorney, Agent, or Firm*—Sprung, Felfe, Horn, Lynch & Kramer

[57] ABSTRACT

A dye of the formula

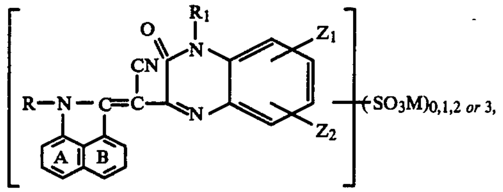

wherein

R is alkyl, alkenyl, cycloalkyl, aralkyl or hydrogen, $R_1$ is alkyl, alkenyl, cycloalkyl, aralkyl or hydrogen, and R and $R_1$ can be substituted, $Z_1$ and $Z_2$ are nonionic substituents or hydrogen, and M is hydrogen or a cation, and A and B can carry nonionic substituents and/or an optionally modified–COOH group. The new dyestuffs dye polyester fibers in brilliant red shades with excellent fastness.

16 Claims, No Drawings

DISPERSION DYESTUFFS OF THE NAPHTHOLACTAM SERIES

The invention relates to naphtholactam dyes of the general formula (I)

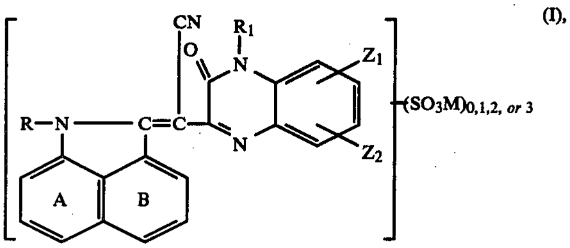
(I), wherein

R is alkyl, alkenyl, cycloalkyl, aralkyl or hydrogen, $R_1$ is alkyl, cycloalkyl, aralkyl or hydrogen, $Z_1$ and $Z_2$ are nonionic substituents or hydrogen, and M is hydrogen or a cation, and A and B can carry nonionic substituents and/or an optionally modified—COOH group.

The new dyes of the formula (I) can be produced by various processes.

A particularly advantageous process comprises condensing a naphtholactam compound of the formula (II)

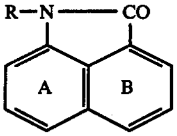
(II), in the presence of an acid condensation agent, preferably phosphorus oxychloride, with a methylene-active compound of the formula

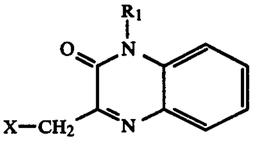
(III), in which formulae the symbols R, A, B and $R_1$ have the above-given meanings, and X is CN or $CONH_2$; and optionally sulphonating, brominating, chlorinating, nitrating and/or hydrolysing the condensation product obtained. If the methylene-active compounds of the formula (III) used as starting material are those in which X is $—CONH_2$, there is obtained on condensation with phosphorus trichloride the corresponding nitrile (X=CN).

Another of these processes comprises condensing a compound of the formula

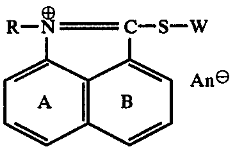
(IV)

wherein W is a $C_1$-$C_4$-alkyl group, preferably methyl or ethyl, An is an anion, and R, A and B have the aforementioned meanings, with a compound of the formula (III), with W-SH and H-An being split off.

Suitable radicals R are, besides hydrogen, particularly alkyl having 1 to 8 carbon atoms, hydroxyalkyl having 2 or 3 carbon atoms, alkoxyalkyl having 3 to 8 carbon atoms, β-chloroethyl, β-cyanoethyl, alkoxycarbonylethyl having 1 to 4 carbon atoms in the alkoxy moiety, carbamoylethyl, N-mono- or N,N-disubstituted alkylcarbamoylethyl having 1 to 4 carbon atoms in the alkyl moiety, cyclohexyl, benzyl, phenylethyl or phenyl, and also alkenyl. Preferred groups are aliphatic groups, as well as benzyl and phenethyl, and especially the hydrogen atom.

There may be mentioned in particular, for example: methyl, ethyl, propyl, butyl, hexyl, β-ethylhexyl, β-hydroxyethyl or β-hydroxypropyl, methoxyethyl, ethoxyethyl, methoxypropyl, ethoxypropyl, butoxypropyl, amyloxypropyl, methoxycarbonylethyl, ethoxycarbonylethyl, allyl or butoxycarbonylethyl, and preferably methyl, ethyl or β-cyanoethyl.

Suitable radicals $R_1$ are, besides hydrogen, $C_1$-$C_8$-alkyl, such as methyl, ethyl, propyl, pentyl and n-octyl and benzyl, as well as the other groups mentioned for R.

Examples of nonionic substituents on the rings A and B and for the radicals $Z_1$ and $Z_2$ are $C_1$-$C_4$-alkyl, $C_1$-$C_4$-alkoxy, $C_1$-$C_4$-alkylmercapto, phenoxy, phenylmercapto, bromine, chlorine, nitro, $C_1$-$C_4$-alkylsulphonyl, phenylsulphonyl, $C_1$-$C_5$-alkylcarbonylamino, cyano, chlorocarbonyl, carbonamide, carboxylic acid ester, carboxylic acid hydrazide and sulphonamide, and by alkyl is meant in particular those groups having 1 to 4 carbon atoms such as methyl, ethyl, propyl, isopropyl and n-butyl; by alkoxy groups especially those having 1 to 4 carbon atoms such as methoxy, ethoxy, n-propoxy, n-butoxy and isopropoxy; by halogen especially fluorine, particularly chlorine and bromine; by $C_1$-$C_4$-alkylmercapto and alkylsulphonyl in particular those having 1 to 4 carbon atoms in the alkyl moiety, such as methylmercapto, β-hydroxyethylmercapto, isopropylmercapto or n-butylmercapto, or methylsulphonyl, β-hydroxyethylsulphonyl, isopropylsulphonyl or n-butylsulphonyl; by arylsulphonyl particularly phenylsulphonyl; by aralkylsulphonyl preferably benzylsulphonyl; by acylamino especially $C_1$-$C_4$-alkylcarbonylamino such as acetylamino, and $C_1$-$C_4$-alkylsulphonylamino such as methylsulphonylamino; and by carbonamide and sulphonamide radicals especially carbonamide or sulphoneamide radicals substituted by one or two alkyl radicals containing 1 to 4 carbon atoms, such as methyl, ethyl or n-butyl.

Particularly preferred are dyes containing in the 4-position an optionally modified carboxylic acid group, such as —COOH, —CN, —COCl, —CO-Q' preferably —CO-OT$_1$', with Q' being the radical of an amine H—Q', and $T_1$' being optionally substituted alkyl, alkenyl, cycloalkyl, aralkyl or aryl, or a heterocyclic radical. These dyes can contain a second substitutent, such as a halogen atom, especially a chlorine or bromine atom, in the 5-position.

In particular, the group $T_1$ can be, for example: a $C_1$-$C_{18}$-alkyl group which is optionally substituted by $C_1$-$C_4$-alkoxy, hydroxyl, chlorine, bromine, cyano, carboxyl, carb-$C_1$-$C_4$-alkoxy, sulpho, carbonamide or acetoxy; there my be mentioned for example: methyl, butyl, propyl, ethyl, octyl, β-cyanoethyl, β-chloroethyl, β-hydroxyethyl, β-hydroxypropyl, β-hydroxy-γ-chloropropyl, β-carboxyethyl, β-carbomethoxy, β- carboethoxy or β-carbobutoxyethyl, β-carbonamidoethyl and β-acetoxyethyl; also cycloaliphatic groups such as cyclopentyl, methylcyclohexyl, trimethylcyclohexyl, or preferably cyclohexyl; phenyl, benzyl or phenethyl optionally substituted by $C_1$–$C_4$-alkyl such as methyl, lower alkoxy such as methoxy, or by chlorine, bromine, fluorine, cyano or nitro.

Water-solubilising groups are particularly sulphonic acid groups, and groups with positively charged (quaternary) nitrogen atoms. Free carboxyl groups (—COOH) are as a rule classed with the water-solubilising groups; however, they produce solubility in water generally only in the form of their salts, e.g. the alkali salts, so that a preferred embodiment is with the exclusion of the free carboxyl groups.

Suitable cations M are those of inorganic or organic bases; applicable as inorganic bases are in particular alkali metal cations such as Na, K, Li as well as ammonium; and as organic bases for example pyridinium, alkylammonium and dialkylammonium, with the alkyl groups preferably having 1 to 4 carbon atoms; and also cations of basic dyes. Monosulphonated dyes are preferred.

The term "lower" denotes, when used in connection with definitions such as alkyl, alkoxy, carbalkoxy, etc., that the alkyl groups occurring in the radical do not contain more than 4 carbon atoms.

Preferred dyes are those of the formula

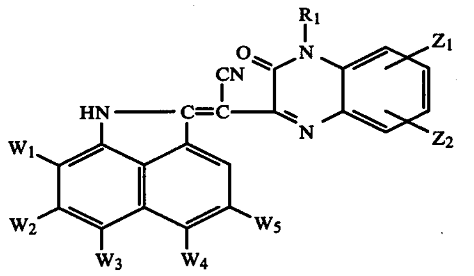

(V)

wherein X, $Z_1$, $Z_2$ and $R_1$ have the aforegiven meanings, $W_1$ is hydrogen, chlorine, bromine, alkyl, alkoxy, nitro or arylmercapto, $W_2$ is hydrogen or chlorine, $W_3$ is hydrogen, chlorine, bromine, alkyl, alkoxy, nitro, acylamino, alkylsulphonylamino, arylsulphonylamino, alkylmercapto, arylmercapto, arylsulphonyl, alkylsulphonyl, optionally N-substituted sulphonamide, alkanoyl or aroyl, $W_4$ is hydrogen, chlorine, bromine, alkoxy, arylmercapto, or the COOH group and modified radicals thereof, $W_3$ and $W_4$ together are a radical of the formula

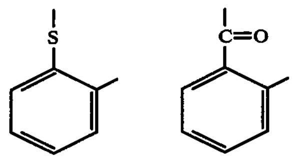

and $W_5$ is hydrogen, chlorine or alkoxy.

$W_1$ is, e.g., methyl, methyl, methoxy, ethoxy, phenylmercapto, or phenylmercapto substituted by chlorine, methyl, methoxy, phenyl, phenoxy ormethoxycarbonyl.

To be mentioned for $W_3$ are the same radicals as for $W_1$, as well as naphthylmercapto, acetylaminophenylmercapto, acetylamino, propionylamino, benzoylamino, benzoylamino substituted by chlorine, bromine, methyl or methoxy, methylsulphonylamino, ethylsulphonylamino, phenylsulphonylamino, tolylsulphonylamino, methylmercapto, ethylmercapto, β-hydroxyethylmercapto, methylsulphonyl, ethylsulphonyl, phenysulphonyl, tolylsulphonyl, chlorophenylsulphonyl, acetyl, propionyl, butyryl, benzoyl, benzoyl substituted by methyl, methoxy, chlorine or bromine, sulphamoyl, N-methyl-, N-ethyl-, N-butyl-, N-phenyl-, N-chlorophenyl, N-methylphenyl-, N-methoxyphenyl-, N-trifluoromethylphenyl-, N-methyl-N-phenyl-, N,N-dimethyl-, N,N-diethyl-, N,N-dipropyl- or N,N-dibutylsulphamoyl, pyrrolidinosulphonyl, piperidinosulphonyl or morpholinosulphonyl. Also applicable are the radicals of the formulae $NHCONH_2$, $NHCONHCH_3$ or $NHCONHC_6H_5$.

Radicals $W_4$ are, besides hydrogen and chlorine, the alkoxy and arylmercapto radicals mentioned for $R_1$, and in particular modified carboxylic acid radicals.

Alkoxy radicals $W_5$ are, for example, methoxy or ethoxy.

Preferred dyes are those of the formula

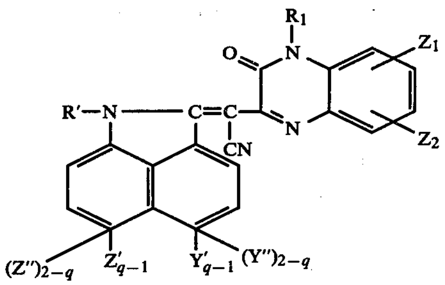

wherein $R_1$ has the aforegiven meaning, and R′ is lower alkyl or preferably hydrogen, Z′ is hydrogen and halogen, Z″ is hydrogen, halogen, —$SO_2$-lower alkyl, —$SO_2$-aryl, —$SO_2$-N-(lower alkyl)$_2$ and CN, Y′ is COCl, COOH or $CONHT_5$, but particularly $COOT_4$ and $CONT_5T_6$, wherein $T_4$, $T_5$ and $T_6$ are optionally substituted hydrocarbon radicals, especially alkyl and aralkyl radicals having 1 to 8 carbon atoms, Y″ is halogen and hydrogen, $Z_1$ and $Z_2$ are nonionic substituents, and q is 1 or 2.

Suitable radicals of the formulae —$NHT_5$ and —$NT_5T_6$, such as are mentioned in the aforementioned definition of Y′, are for example the following amino groups: methylamino, ethylamino, dimethylamino, diethylamino, dipropylamino, di-n-butylamino, N-methyl-N-butylamino, N-(2-hydroxy-, 2-chloro-, 2-methoxy-, 2-bromo-, 2-cyanoethyl)-amino, N,N,-di(2-hydroxy-, 2-chloro-, 2-methoxy-, 2-cynaoethyl)-amino, N-2-cyanoethyl-N-ethyl-amino, N-2-cyanoethyl-N-2-hydroxyethylamino, N-2-lower alkoxy (e.g. $C_1$–$C_4$-alkoxy)-N-lower alkyl (e.g. $C_1$–$C_4$-alkyl, particularly methyl)-amino, N-methoxyethyl-N-cyanoethylamino, N-methyl-N-ethanolamino, N-2-methylthioethyl-amino, N-2-methylsulphonylethyl-amino, γ-methoxypropyl-amino, γ-cyanopropylamino, γ-carboxylpropylamino, γ-sulphopropylamino, radicals of the formula (lower alkyl)$_2$N($CH_2$)$_{1-4}$—NH—, such as dimethylamino-ethylamino, dibutylamino-ethylamino, radicals of the formula (N-morpholinyl-, N-pyrrolidinyl-, N-piperidinyl)-($CH_2$)$_{1-4}$—NH—, N-hydroxyethyl-N- cyclohexylamino, 3-hydroxy-1,1-dimethylpropylamino, benzylamino, o-, m-, p-nitrobenzylamino, o-, m-, p-methylbenzylamino, o-, m-, p-methoxybenzylamino, phenylethylamino, cyclohexylamino, methylcyclohexylamino, 2,2,5-trimethylcyclohexylamino, dicyclohexylamino, tetramethylene-sulphonyl-3-amino, N-pyrrolidinyl, N-piperidinyl, N-morpholinyl, N-4-sulphopiperidinyl (N-thiomorpholinyl,

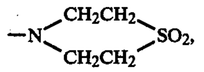

N-(N-'-lower alkyl-, e.g. methyl)-piperazinyl, N-(N'-lower alkylcarbonyl, e.g. acetyl)-piperazinyl and N-(N'-hydroxyethyl)-piperazinyl.

Valuable dyes are, for example, those of the formula

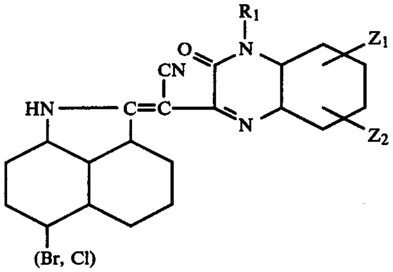

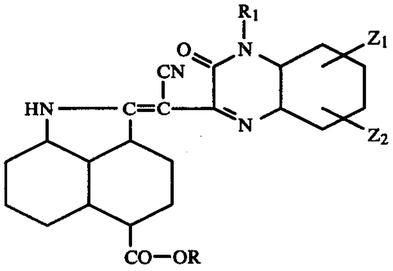

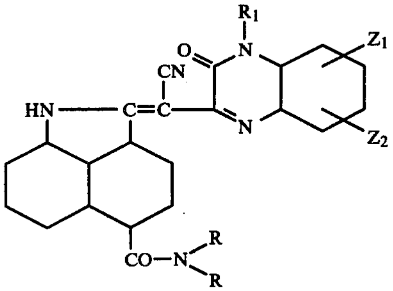

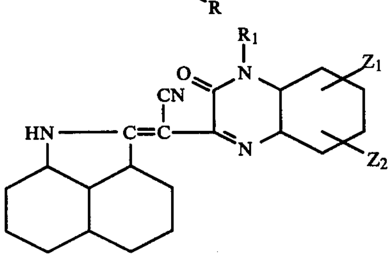

The quinoxalines III can be obtained, for example, by reaction of monosubstituted o-phenylenediamines of the formula

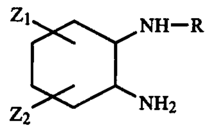

with oxalacetic acid nitriles of the formula lower alkyl—O—CO—CO—$CH_2$—CN.

Preferred substituents among the radicals given above in the definition of $Z_1$ and $Z_2$ are, in particular, lower alkyl, lower alkoxy and chlorine.

The reaction of the naphtholactam of the formula (II) with the methylene-active compounds of the formula (III) is performed in the presence of an acid condensation agent, such as phosphorus oxybromide, phosphorus trichloride, phosphorus tribromide, phosphorus pentachloride, thionyl chloride or phosgene (in an autoclave), or mixtures of phosphorus oxychloride and phosphorus pentoxide, especially however in the presence of phosphorus oxychloride.

The reaction is performed advantageously at elevated temperature, e.g. at temperatures of 50° to 200° C., preferably however within a range of 60° to 130° C. It is preferably performed in an inert organic solvent, such as benzene, toluene, xylene, chlorobenzene, dichlorobenzene, nitrobenzene, ethylene chloride, carbon tetrachloride or chloroform.

The condensation of compounds III and IV is carried out under alkaline reaction conditions, advantageously in an organic solvent, such as methanol, ethanol, butanol, ethylene glycol monomethyl ether, dimethylformamide, pyridine or chlorobenzene, in the presence of a condensation agent having an alkaline reaction such as trimethylamine, potassium carbonate, sodium hydroxide and magnesium oxide, at elevated temperature, advantageously at 40° to 160° C., preferably at 60° to 100° C.

The starting products of the formula (IV) are obtainable, in a known manner, by reaction of a naphtholactam compound of the formula (V) with diphosphorus pentasulphide to give the corresponding thione compound, and reaction thereof with quaternising agents R-An, preferably dimethyl sulphate.

The optional subsequent sulphonation of compounds of the formula I which contain no sulphonic acid groups is advantageously performed by reaction with customary sulphonating agents, preferably oleum containing 5 to 60% of $SO_3$, whereby one to two sulpho groups are introduced. The reaction is advantageously performed at temperatures between 5° and 50° C., by methods known per se.

The optional nitration is performed, in the customary manner, with a mixture of nitric acid and sulphuric acid; the halogenation by means of reaction with elementary bromine or chlorine.

A further method of obtaining the dyes of the formula I comprises performing the condensation with halogen-containing condensation agents, such as in particular phosphorus oxychloride, so that in the 4-position of the naphtholactam there is formed a —CO-halogen group, especially a chlorocarbonyl group, which is subsequently reacted with alcohols, phenols, amines or mercaptans to the corresponding esters, amides or thioesters.

Alcohols and phenols suitable for the reaction are, e.g.: methanol, ethanol, n-propanol, i-propanol, butanol, sec.-butanol, iso-butanol, 1,2-dihydroxybutane, 2,5-dihydroxyhexane, 3-methyl-1,5-dihydroxypentane, 2-ethylhexanol, 2,2-dimethylpentanol, 2,2,4-trimethylpentanol, dodecy alcohol, octadecyl alcohol, benzyl alcohol, cyclohexanol, allyl alcohol, methallyl alcohol, cynnamyl alcohol, lauryl alcohol, oleyl alcohol, cyclohexanol, tetrahydrofuryl alcohol, diethylene glycol monomethyl ether or diethylene glycol monoacetate, triethylene glycol monobutyl ether, ethylene glycol, 1,3-propylene glycol, 1,4-butanediol, 1,5-pentanediol, 1,6-hexanediol, neopentyl glycol, 2,2-diethylpropane-1,3-diol, 2-ethyl-2-butylpropane-1,3-diol, 2-ethyl-2-propylpropane-1,3-diol, 2,2,4-trimethylhexane-1,6-diol, 2-ethyl-2-methylpropane-1,3-diol, 1,10-decanediol, diethylene glycol, triethylene glycol, $\beta\beta'$-thiodiethanol, 1,1-, 1,2-, 1,3- and 1,4-dimethylolcyclohexane as well as 1,2-, 1,3- and 1,4-$\alpha,\alpha'$-xylene glycol.

Examples of amino alcohols of which the esters are applicable here are: 2-aminoethanol, 3-aminopropanol, 1-amino-2-propanol, 2-amino-2-methylpropanol, 2-aminobutanol, 3-aminobutanol, 3-amino-2-butanol, 3-amino-3-methyl-2-butanol, 2-methylaminoethanol, 2-dimethylaminoethanol, 2-ethylaminoethanol, 2-diethylaminoethanol, 3-methylaminopropane, 3-dimethylaminopropanol, 3-ethylaminopropanol, 3-dimethylaminopropanol, 1-methylamino-2-propanol, 1-dimethylamino-2-propanol, 1-ethylamino-2-propanol, 1-diethylamino-2-propanol, 3-methylaminobutanol, 3-dimethylaminobutanol, 3-ethylaminobutanol, 3-diethylaminobutanol, 3-methylamino-2-butanol, 3-dimethylamino-2-butanol, 3-ethylamino-2-butanol, 3-diethylamino-2-butanol, 2-(2-aminoethylamino)ethanol, N-(2-hydroxyethyl)-piperidine, 2-aminocyclohexanol, 2-methylaminocyclohexanol, 2-dimethylaminocyclohexanol, 2-benzylaminoethanol and $\alpha$-aminoethylbenzyl alcohol; phenol, mono- and polyalkylphenols, e.g. 2-, 3- or 4-methyl-, -ethyl-, -n-propyl, -isopropyl-, -n-butyl-, -isobutyl-, -tert.-butyl-, -n- or -isopentyl-, -n- or -isododecyl-, -n- or -isopalmityl-, -n- or -isostearyl-, -ethane-, -propene-, -butene- and -ethinephenol; 2,3-, 2,4-, 2,5-, 2,6-, 3,4-, 3,5-dimethyl-, -diethyl- and -dipropylphenols, 2,3,4-, 2,3,5-, 2,3,6-, 3,4,5- or 2,4,6-trimethyl-, -triethyl- and -tripropylphenol; 2,3,4,6-, 2,3,4,5- or 2,3,5,6-tetramethyl-, -tetraethyl- and -tetrapropylphenols, and 2,3,4,5,6-pentamethylphenol. The abovementioned alkyl radicals can also be mixed, e.g., 2,6-dimethyl-4-tert.-butylphenol; cycloalkylphenols, for example 2-, 3- or 4-cyclohexylphenol; substituted alkylphenols, for example 4-chloromethyl-, 4-hydroxymethyl- and 3-trifluoromethylphenol; aralkylphenols, for example 2-, 3- or 4-benzylphenols; arylphenols, for examples 2-, 3- or 4-hydroxydiphenyl; alkylamino-, arylamino- and acylaminophenols, for example 2-, 3- or 4-acetylamino-, 2-, 3- or 4-benzoylamino-, 2-, 3- or methacroylamino- and N-methyl-N-formyl-4-aminophenol; halogenophenols, for example 2-, 3- or 4-chloro- or -bromophenol, 2,3-, 2,4-, 2,5-, 2,6-, 3,4- or 3,5-dichloro(bromo)phenol, 2-methyl-5-chloro, 2-methyl-6-chloro-, 3-methyl-4-chloro-, 5-methyl-2-chloro-, 2-methyl-4-chloro- or 2-methyl-3-chlorophenol, and 3,5,3',5'-tetrachloro-2,2'-dihydroxydiphenyl; nitrophenols, for example 2-, 3- or 4-nitrophenol, 2-methyl-5-nitro, 4-methyl-2-nitro-, 3-methyl-4-nitro-, 4-methyl-3-nitro- and 3,5-dimethyl-4-nitrophenol; hydroxyphenylsulphonic acids and hydroxphenylcarboxylic acids and their esters and amides, for example 3- or 4-hydroxybenzoic acid or -benzenesulphonic acid, 2-, 3- or 4-hydroxybenzoic acid (or -benzenesulphonic acid) methyl ester, -propyl ester, -isobutyl ester, -phenyl ester, -naphthyl ester and -halogenophenyl ester, 2-hydroxy-5-chlorobenzoic acid ester, 2-cyanato-3-methyl-benzoic acid esters, 2-, 3- or 4-hydroxybenzoic acid dimethylamide, -diethylamide, -morpholylamide or -piperidylamide; alkoxy-, aryloxy- and acyloxyphenols, for examples 2-, 3- or 4-methoxy- -ethoxy-, -propoxy-, isopropoxy-, -butoxy-, -phenoxy-, acetoxy- and -benzoxyphenols, N,N-dialkylcarbamate and 4-allyl-2-methoxyphenol; acylphenols, for example 2-, 3- or 4-acetyl-, propionyl- and -benzoylphenol and 4-acetyl-1,3,-dihydroxybenzene; cyanophenols, for example 2-, 3- or 4-cyanophenol; phenols with S-containing substituents, for example 2-, 3- or 4-methylmercapto-, -ethylmercapto-, -propylmercapto-, -phenylmercapto-, -acetylmercapto- and -benzoylmercapto-phenols, 3- or 4-mercaptophenols, 2,4-bismethylmercapto-3-methyl-phenol and

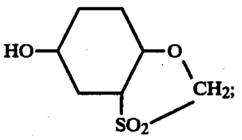

polyhydric phenols, such as, for example pyrocatechol, hydroquinone, resorcinol and the like; alkylated dihydroxyphenols, such as, for example, 1,3-dihydroxy-4-methylbenzene or 1,2-dihydroxy-4-hexylbenzene; alkoxylated dihydroxyphenols, such as, for example, 1,4-dihydroxy-3-hexoxybenzene; cycloaliphatic phenols, such as, for example, p-cyclopentylphenol or p-cyclohexylphenol; halogenated dihydroxyphenols, such as, for example, 1,2-dihydroxy-4-chlorobenzene; trihydric phenols, such as, for example, phloroglucinol or pyrogallol; and polynuclear phenols, such as, for example, 2,2-bis-(p-hydroxyphenyl)-propane, 4,4'-dihydroxydiphenyl, 2,2'-dihydroxydiphenyl, 2,4'-dihydroxydiphenyl and dihydroxynaphthalenes, such as 2,6-dihydroxynaphthalene. Dihydroxyarylsulphones, for example bis-(p-hydroxyphenyl)-sulphone, 2,4'-dihydroxydiphenylsulphone, 5'-chloro-2,4-dihydroxydiphenylsulphone, 5'-chloro-2,4'-dihydroxydiphenylsulphone, 3'-chloro-4,4'-dihydroxydiphenylsulphone and bis-(4-hydroxyphenyl)-biphenyldisulphone, can also be used.

Aromatic dihydroxy-ethers, for example p,p'-dihydroxydiphenyl ether, p,p'-dihydroxytriphenyl ether, the 4,3'-, 4,2'-, 3,3'-, 2,2'- and 2,3'-dihydroxydiphenyl ethers and 4,4'-dihydroxy-2,5-dimethyldiphenyl ether, are also suitable, as are the addition products of equimolar amounts of ethylene oxide and mercaptans, and also n-butylmercaptan, phenylmercaptan, 2-, 3- or 4-chlorophenylmercaptan, 2,4- or 2,5-dichlorophenylmercaptan, 2-, 3- or 4-methylpheylmercaptan, 2,4- or 2,5-dimethylphenylmercaptan, 2-, 3- or 4-methoxyphenylmercaptan, 2,4- or 2,5-dimethoxyphenylmercaptan, 2- or 4-nitrophenylmercaptan, 2- or 4-carbomethoxyphenylmercaptan, 2-mercaptobenzthiazole, 2-mercapto-6-chlorobenzthiazole, 2-mercapto-4-chloro-benzthiazle, 2-mercapto-4-methyl-benzthiazole, 2-mercapto-6-methylbenzthiazole, 2-mercapto-6-methoxy-benzthiazole, 2-mercapto-6-ethoxy-benzthiazole, 2-mercapto-benzoxazole and 2-mercaptobenzimidazole.

Compounds $H_2N\text{-}NR_3R_4$ which can be employed, optionally in the form of their salts, such as hydrochlorides, hydrobromides, hydroiodides, nitrates, sulphates or acetates, are, for example, the following hydrazines and hydrazides and cyclohexanone hydrazone: methylhydrazine, isopropylhydrazine, phenylhydrazine, 2-nitrophenylhydrazine, 3-nitrophenylhydrazine, 4-nitrophenylhydrazine, 2,4-dinitropheylhydrazine, 2-chlorophenylhydrazine, N-aminopiperidine, N-aminopyrrolidone, N-aminomorpholine, N-aminocarbazole, N-aminotetrahydro(iso)quinoline, methanesulphonic acid hydrazide, ehtanesulphonic acid hydrazide, isopropanesulphonic acid hydrazide, hexanesulphonic acid hydrazide, cyclohexanesulphonic acid hydrazide, $C_1$–$C_5$-alkanolyhydrazides, such as acetylhydrazide, benzoylhydrazide, benzenesulphonic acid hydrazide, 2-, 3- or 4-toluenesulphonic acid hydrazide, 2-, 3- or 4-chloro-(bromo- or fluoro-)benzenesulphonic acid hydrazide, 2-, 3- or 4-hydroxybenzenesulphonic acid hydrazide, 2-, 3- or 4-dimethylaminobenzenesulphonic acid hydrazide, 2-, 3- or 4-nitrobenzenesulphonic acid hydrazide, 2-, 3- or 4-methylmercapto-benzenesulphinic acid hydrazide, quinolinesulphonic acid hydrazides, carbazolesulphonic acid hydrazides, phenylpyrazolonesulphonic acid hydrazides and imidazolesulphonic acid hydrazides.

The naphtholactam compounds of the formula II which are used as starting products are known. Examples which may be mentioned are: naphtholactam-(1,8), 4-methoxy-naphtholactam-(1,8), 4-bromonaphtholactam-(1,8), 4-chloronaphtholactam-(1,8), 2,4-dichloronaphtholactam-(1,8), 4-nitro-naphtholactam-(1,8), 4-methylsulphonyl-naphtholactam-(1,8), 4-morpholinosulphonylnaphtholactam-(1,8), 4-methylmercapto-naphtholactam-(1,8), 4-sulpho-naphtholactam-(1,8) and 2-methyl-naphtholactam-(1,8).

The naphtholactam compounds used as starting materials, having substituents in the 4-position derived from the carboxyl group, are obtainable by reacting o-xylylene dicyanide with glyoxal in the presence of a base (NaOH or KOH) and a solvent at temperatures below 50° C. (for example 0° to 40° C.) to give 1,4-dicyanonaphthalene and subsequently either (a) saponifying the 1,4-dicyanonaphthalene in a basic or, preferably, acid medium to give the 1,4-dicarboxylic acid and either converting the 1,4-naphthalene-dicarboxylic acid into a functional derivative and then converting the latter, using a 10 to 50% excess of nitric acid, to the 8-nitro-1,4-naphthalene-dicarboxylic acid derivative and reducing this to the 8-amino derivative, or nitrating the 1,4-naphthalene-dicarboxylic acid direct and subsequently reducing the reaction product to the 8-aminonaphthalene-2,4-dicarboxylic acid, and then converting the 8-amino derivative into the 1,8-naphtholactam-4-carboxylic acid, or functional derivatives thereof, either by spontaneous cyclisation or by warming, or (b) nitrating the 1,4-dicyanonaphthalene in the 8-position using a 10 to 50% excess of nitric acid and subsequently reducing the nitro group to the 8-amino group, effecting naphtholactam cyclisation by spontaneous formation or by warming and saponifying the cyano group in the 4-position, if this has not already been saponified during the reduction of the 8-nitro group, in a basic or acid medium, optionally via the stage of the 4-carbonamido-1,8-naphtholactam.

The naphtholactams which carry an organic group as the substituent R on the lactam ring are obtained, for example, by alkylating the corresponding naphtholactams which carry hydrogen on the nitrogen atom of the lactam ring (R=H) in a polar aprotic solvent, such as dimethylformamide or N-methylpyrrolidone, with a toluenesulphonic acid ester of the formula

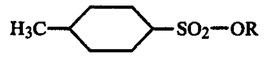

in the presence of a strong base, such as sodium hydroxide or potassium hydroxide. R has the same meaning as above.

The dyes of the formula I give brilliant, luminous red to violet dyeings which in most cases fluoresce in UV light and have outstanding fastness properties in service, with the dyes containing no water-solubilising groups being especially valuable.

The new dyes preferably contain no sulphonic acid groups, and are suitable for dyeing semi-synthetic and fully synthetic fibres, such as acrylic fibres or acrylonitrile fibres, polyacrylonitrile fibres and copolymers of acrylonitrile and other vinyl compounds, such as acrylates, acrylamides, vinylpyridine, vinyl chloride or vinylidene chloride, copolymers of dicyanoethylene and vinyl acetate and also acrylonitrile block copolymers, fibres made of polyurethanes, polyolefins, such as basic modified, nickel-modified or unmodified polypropylene, and cellulose triacetate and cellulose 2½ acetate, and espcially fibres made of polyamides, such as nylon-6, nylon-6,6 or nylon 12, and fibres made from aromatic polyesters, such as those from terephthalic acid and ethylene glycol or 1,4-dimethylolcyclohexane, and copolymers from terephthalic acid and isophthalic acid and ethylene glycol.

Dyeing of the stated fibre materials with the preferably difficultly water-soluble dyes is preferably performed from an aqueous dispersion.

It is therefore advantageous to finely divide the dyes usable as disperse dyes by grinding them with textile auxiliaries, such as dispersing agents and possibly with grinding auxiliaries. By subsequent drying are obtained dye preparations consisting of the textile auxiliary and the dye.

The following may be mentioned as advantageously applicable dispersing agents of the nonionic group: addition products of 8 mols of ethylene oxide with 1 mol of p-tert.-octylphenol, of 15 or 6 mols of ethylene oxide with castor oil and of 20 mols of ethylene oxide with the alcohol $C_{16}H_{33}OH$; addition products of ethylene oxide with di-[α-phenylethyl]-phenols, polyethylene oxide tert.-dodecyl thioethers, polyamine polyglycol ethers; or addition products of 15 or 30 mols of ethylene oxide with 1 mol of the amine $C_{12}H_{25}NH_2$ or $C_{18}H_{37}NH_2$.

Anionic dispersing agents which may be mentioned are: sulphuric acid esters of alcohols of the aliphatic series with 8 to 20 carbon atoms, of the ethylene oxide adducts of the corresponding fatty acid amides, or of alkylated phenols with 8 to 12 carbon atoms in the alkyl group; sulphonic acid esters containing alkyl groups with 8 to 20 carbon atoms; sulphation products of unsaturated fats and oils; phosphoric acid esters containing alkyl groups with 8 to 20 carbon atoms; fatty acid soaps and also alkylarylsulphonates, condensation products of formaldehyde and naphthalenesulphonic acid and lignin sulphonates.

Suitable cationic dispersing agents are quaternary ammonium compounds which contain alkyl or aralkyl radicals with 8 to 20 carbon atoms.

In addition to the dispersing agents, the dye formulations can also contain organic solvents, especially solvents which boil above 100° C. and which preferably are miscible with water, such as mono- and di-alkylglycol ethers, dioxane, dimethylformamide or dimethylacetamide, tetramethylenesulphone or dimethylsulphoxide. The dye, the dispersing agent and the solvent can advantageously be ground together.

A dye formulation of this type is manufactured, for example, by mixing 2 to 30, and preferably 5 to 20, percent by weight of the dispersing agent to a paste with 10 to 55 percent by weight, and preferably apporximately the two-fold to four-fold amount, of the dye and about 10 to 20 parts of a glycol or of another water-retaining agent. Subsequently, for example, the pH value is adjusted to about 4 with a dilute acid, preferably with sulphuric acid or acetic acid, and the mixture is then made up to 100% with water. The mixture is then ground to the necessary fineness, for example in a glass mill or another dispersing apparatus, and during this operation the grinding temperature can be between 20° and 90° C.

The dyeing of the polyester fibres with the dyes according to the invention, which are difficultly soluble in water, from an aqueous dispersion is carried out by the processes customary for polyester materials. Polyesters of aromatic polycarboxylic acids with polyhydric alcohols are preferably dyed at temperatures of above 100° C. under pressure. However, dyeing can also be carried out at the boiling point of the dye bath in the presence of colour-transfer agents, for example phenylphenols, polychlorobenzene compounds or similar auxiliaries, or can be effected by the thermosol process, that is to say padding with subsequent hot after-treatment, for example thermofixing, at 180° to 210° C.

Cellulose 2½-acetate fibres are preferably dyed at temperatures of 80° to 85° C., whilst cellulose triacetate fibres are advantageously dyed at the boiling point of the dye bath. The use of colour-transfer agents can be dispensed with when dyeing cellulose 2½-acetate fibres or polyamide fibres. Dyes according to the invention can also be used for printing the said materials by customary methods.

The dyeings obtained according to the present process can be subjected to an after-treatment, for example by heating with an aqueous solution of a non-ionic detergent.

According to the present process it is also possible to apply the indicated compounds by printing, instead of by impregnating. For this purpose, for example, a printing ink which contains the finely dispersed dyes in addition to the auxiliaries customary in printing, such as wetting agents and thickeners, is used.

Furthermore, for example, synthetic fibres, such as polyesters andpolyamides, can be dyed in organic solvent liquors, such as in a mixture of perchloroethylene and dimethylformamide or in pure perchloroethylene.

Deep, luminous dyeings and prints with excellent fastness properties, especially fastness to light, thermofixing, sublimation, pleating, flue gas, cross-dyeing, dry-cleaning, ironing, rubbing, chlorine and wet processing, such as fastness to water, washing and perspiration, are obtained by the present process.

The new dyes, which are insoluble in water, can also be used for spin-dyeing polyamides, polyesters and polyolefines. The polymer to be dyed is appropriately mixed, in the form of a powder, granules or chips, as a ready-to-use spinning solution or in the molten state with the dye, which is introduced in the dry state or in the form of a dispersion or solution in an optionally volatile solvent. After homogeneous dispersion of the dye in the solution or melt of the polymer, the mixture is processed in a known manner by casting, pressing or extruding to fibres, yarns, monofilaments, films and the like.

The dyes according to the invention are outstandingly suitable for dyeing oils or macromolecular materials, such as lacquers, films, sheets and mouldings, for example those made of cellulose esters, such as cellulose 2½-acetate and cellulose triacetate, polyvinyl compounds, such as polyvinyl chloride and polyvinyl acetate; polyurethanes, polystyrene, polyesters, polyamides and polycarbonates in bulk. The dyes which can be used for this application are, in particular, the compounds of the formula I which are not in the form of a salt and also those which contain sulpho groups and are in the form of salts of suitable organic cations, such as, for example, those of alkylamines which solubilise fats or of basic dyestuffs.

The dyes according to the invention possess high fastness to light, even in light dyeings and in combination with other disperse dyes, high brilliance (fluorescence), high fastness to sublimation, a low sensitivity to carriers in respect of the fastness to light and a high depth of colour, coupled with a good reserve for other fibres, for example wool fibres. They also have only a low sensitivity to changes in pH and are especially suitable for the high temperature process and the thermosol process as well as for permanent press finishing ("Koratron" process). They are also suitable for printing by all customary processes, including, inter alia, for the printing of mixed fabrics.

They possess a high fastness to light, good stability to heat and good solubility, even in the case of bulk dyeings (especially polyester spinning compositions). Coupled with a high fastness to sublimation, they display no migration on the surface when the fibres are subjected to heat treatments (for example on texturing) and display good fastness to rubbing.

the sulphonated representatives of the dyes according to the invention are in the main used for dyeing wool and synthetic polyamides and, for this purpose, aqueous solutions which contain textile auxiliaries, such as, for example, levelling agents, are used.

In the examples which follow, parts denote parts by weight, unless otherwise stated, percentages denote percentages by weight and the temperatures are given in degrees Centigrade.

Preparation of the starting materials (a) 15.6 parts by weight of o-xylylene dicyanide and 8.5 parts by weight of glyoxal hydrate (trimer) (3 $C_2H_2O_2.2H_2O$) containing 80% of glyoxal to be liberated are stirred into 200 parts by volume of methanol. 11.2 parts by weight of powdered potassium hydroxide are added in portions to the reaction mixture, at 15°, whilst stirring and under nitrogen.

After the potassium hydroxide has been added, the reaction mixture is stirred for a further 15 hours at room temperature and under nitrogen. The slightly brown-coloured reaction mixture is then freed from methanol in vacuo and diluted with 500 parts by volume of water. The crude 1,4-dicyanonaphthalene which has precipitated is filtered off and washed with water until neutral. 11parts by weight (61.8% of theory) of 1,4-dicyanonaphthalene are obtained in the form of slightly brown-coloured small needles with a melting point of 175° to 185° C.

After recrystallising once from alcohol with the aid of 5 parts by weight of active charcoal, 5.5 parts by weight of the compound

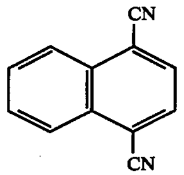
(101)

are obtained in the form of beautiful needles with a melting point of 204° to 205° C.

(b) 46.4 g of technical grade naphthalene-1,4-dicarboxylic acid (93% pure) are introduced at a temperature of 20° to 25° into a stirred flask which contains 480 g of 93% strength sulphuric acid, whilst stirring. The resulting thick suspension is cooled to 0° and a mixture consisting of 22 g of 63% strength nitric acid and 22 g of 93% strength sulphuric acid is allowed to run in dropwise in the course of 30 minutes at 0° to 2°, with external cooling. The mixture is then stirred for a further 5 hours at 0° to 5° and is then poured onto 1 kg of fine ice. The product which has precipitated is filtered off using a suction filter and is washed with water until neutral, after which the resulting product of the formula

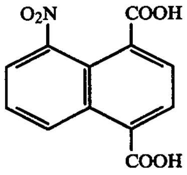

is dried in vacuo at 70°. Yield 45 g.

For purification, 45 g of the crude product is heated briefly to the boil with 225 ml of glacial acetic acid, the mixture is then allowed to cool and the product which has precipitated is filtered off at room temperature. This gives the nitro compound in the form of a pale grey powder which dissolves completely, in water when sodium carbonate is added. Melting point 252°.

52 parts of 8-nitro-naphthalene-1,4-dicarboxylic acid are dissolved in 700 parts of absolute ethyl alcohol and the solution is boiled under reflux for 12 hours whilst continuously passing in hydrogen chloride gas. The resulting solution is evaporated in vacuo. The 4-ethoxycarbonyl-8-nitro-naphthalene-1-carboxylic acid of the formula

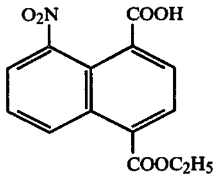

which is obtained in this way, melts at 178° to 180°.

If the monoester is hydrogenated, the 4-ethoxycarbonyl-1,8-naphtholactam described above is obtained and this confirms that the esterification of the carboxylic acid group has taken place in the 4-position.

(d) 130 parts of 8-nitro-naphthalene-1,4-dicarboxylic acid are dissolved in 500 parts of dimethylformamide, 40 parts of sodium hydroxide are added and after stirring for 30 minutes 170 parts by volume of diethyl sulphate are added all at once. The temperature then rises to 90°. The mixture is stirred for 2 hours, paying no attention to the temperature, a small amount of impurities is then filtered off from the solution and the filtrate is discharged into 2,500 parts by volume of a 10% strength sodium chloride solution and 50 parts by volume of a 30% strength sodium hydroxide solution. After stirring briefly, diethyl 8-nitro-naphthalene-1,4-dicarboxylate with a melting point of 107° to 109° is filtered off, washed and dried (e) 32 parts of diethyl 8-nitro-naphthalene-1,4-dicarboxylate are stirred into 200 parts of glacial acetic acid and, after adding 20 parts of iron powder, the mixture is boiled under reflux for 6 hours. For working up, the mixture is filtered hot, the filtrate is diluted with an equal volume of water and the 4-ethoxycarbonyl-1,8-naphtholactam which is thus precipitated is filtered off, washed until neutral and dried. The product of the formula

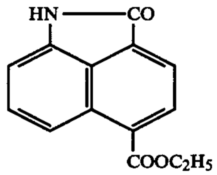

which is obtained in good yield, melts at 216° to 218°. Analysis gave the following values

| | C | H | N |
|---|---|---|---|
| calculated: | 69.7 | 4.6 | 5.8 |
| found: | 69.3 | 4.5 | 5.6 |

(f) 29 parts of dimethyl 8-nitro-naphthalene-1,4-dicarboxylate (which can be prepared analogously to Example 5 using dimethyl sulphate) are dissolved in 500 parts of ethyl acetate and hydrogenated with Raney nickel. 4-Methoxy-carbonyl-8-amino-1-naphtholactam precipitates out virtually completely. After the hydrogenation has ended, the mixture is filtered and the residue is extracted with methylglycol. Evaporation of the extraction solution gives the ester of the formula

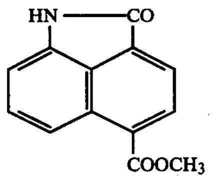

with a melting point of 264° to 266°. Analysis gave the following values:

| | C | H | N |
|---|---|---|---|
| calculated: | 68.72 | 3.99 | 6.17 |
| found: | 68.5 | 4.0 | 5.9 |

(g) 24 parts of 4-ethoxycarbonyl-8-amino-1-naphtholactam are boiled in 180 parts of water and 20 parts of a 30% strength sodium hydroxide solution for one hour under reflux, during which time everything goes into solution. This solution is filtered with charcoal whilst still hot and the filtrate is acidified. The 8-amino-1-naphtholactam-4-carboxylic acid which has precipitated is filtered off after cooling and washed with water and dried.

(h) 44 parts of naphthalene-1,4-dicarboxylic acid are introduced in portions into 900 parts of concentrated sulphuric acid and the mixture is stirred to give a homogeneous suspension. A few crystals of iodine and 36 parts of bromine are then added and the whole is stirred overnight at room temperature. For working up, the mixture is discharged onto ice and filtered and the product is washed with water until neutral. 8-Bromo-naphthalene-1,4-dicarboxylic acid, which is thus obtained, can be purified by recrystallisation from glacial acetic acid. Melting point 288°-290°.

| | C | H | Br |
|---|---|---|---|
| calculated: | 48.84 | 2.39 | 27.08 |
| found: | 48.81 | 2.43 | 26.41 |

(i) 60 parts of 8-bromo-naphthalene-1,4-dicarboxylic acid are introduced into 560 parts of concentrated sulphuric acid and a mixture of 14 parts of a 98% strength nitric acid and 20 parts of concentrated sulphuric acid is added dropwise in the course of one hour, at 20°-25°, whilst stirring. A solution forms transiently and some of the 5-nitro-8-bromo-naphthalene-1,4-dicarboxylic acid then precipitates out. This is separated off by discharging the reaction mixture onto ice, filtering off the precipitate, washing it until neutral and drying. The resulting product was analysed in the form of dimethyl 5-nitro-8-bromo-naphthalene-1,4-dicarboxylate. Melting point 115°-117°.

| | C | H | N |
|---|---|---|---|
| calculated: | 45.68 | 2.74 | 3.80 |
| found: | 45.55 | 2.84 | 3.95 |

(j) 37 parts of dimethyl 5-nitro-8-bromo-naphthalene-1,4-dicarboxylate are stirred into 250 parts by volume of glacial acetic acid and, after adding 20 parts of iron powder, the mixture is kept under reflux for four hours. After cooling to room temperature, the residue is filtered off and dried under reflux in 200 parts by volume of water and 80 parts by volume of a 30% strength sodium hydroxide solution for two hours. The mixture is filtered hot and 4-bromo-naphtholactam-5-carboxylic acid is precipitated by acidifying the filtrate. The methyl ester of this compound has a melting point of 263°-265°.

EXAMPLE 1

A mixture consisting of 2.10 ml of phosphorus oxychloride and 3 ml of chlorobenzene is added dropwise at a temperature of 100°, within 30 minutes, to a mixture of 3.40 g of naphthostyril, 4.00 g of the compound of the formula

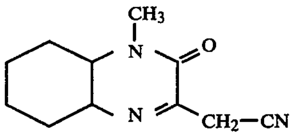

and 30 ml of chlorobenzene, and the mixture is then stirred for a further 2 hours at the same temperature. After cooling to room temperature, the formed precipitate is filtered off; it is washed with chlorobenzene and well filtered off with suction. The product is suspended in 40 ml of isobutanol, and the pH value of the mixture is corrected to 7.0 by the addition of 17 ml of 10% sodium bicarbonate solution. The formed dye of the formula

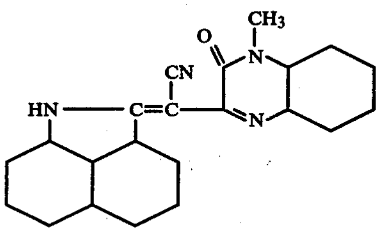

is filtered off; it is washed with isobutanol, then with methanol and subsequently dried at 100° in vacuo.

Applied in a finely dispersed form in the high-temperature process, the dye dyes polyester fabric in a brilliant red shade. The dyes have good fastness properties, particularly a good fastness to sublimation.

EXAMPLE 2

A solution of 12.20 g of the compound of the formula

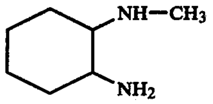

in 40 ml of ethanol is added at room temperature to a mixture of 16.30 g of the sodium salt of the compound of the formula $H_5C_2OOC—CO—CH_2—CN$ in 165 ml of water, and to this mixture is added 7 ml of acetic acid. The mixture is heated in a water bath to 60°, and is subsequently held at 60° to 70° for 30 minutes. The formed yellow-orange precipitate of the product is filtered off with suction while still warm, and is then washed firstly with 200 ml of 20% alcohol and finally with water. The resulting product of the formula

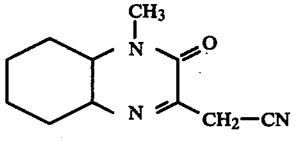

is dried at 70° in vacuo. A lemon yellow powder is formed.

If there are used, instead of the initially given o-phenylenediamine compound, equivalent amounts of the phenylenediamines listed in the following Table I under I, with the procedure being otherwise the same, the corresponding compounds shown in column II are obtained.

Table I
| | I | II |
|---|---|---|
| No. | O-phenylenediamines | Quinoxaline compounds |
| 1 | 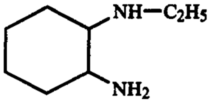 | 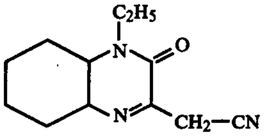 |
| 2 | 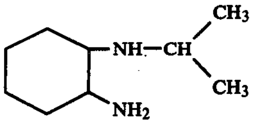 | 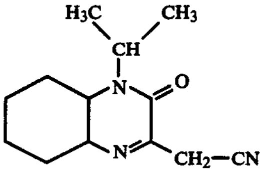 |
| 3 | 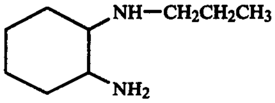 | 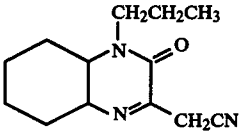 |
| 4 | 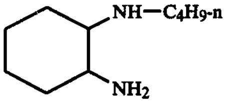 | 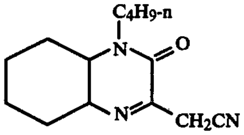 |
| 5 | 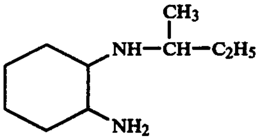 | 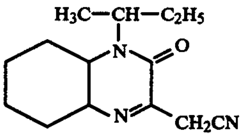 |
| 6 | 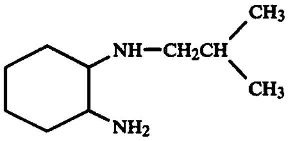 | 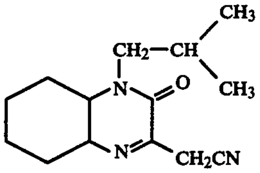 |
| 7 | 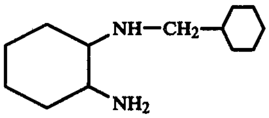 | 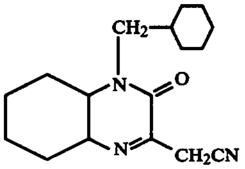 |
| 8 | 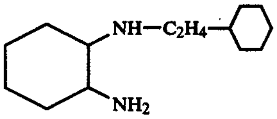 | 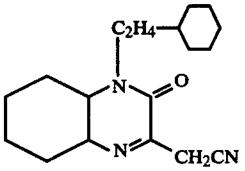 |
| 9 | 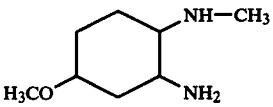 | 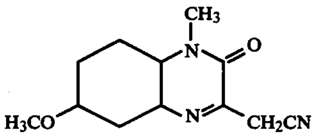 |
| 10 | 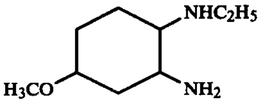 | 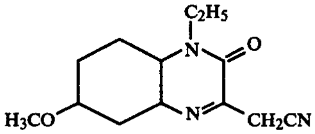 |
| 11 | 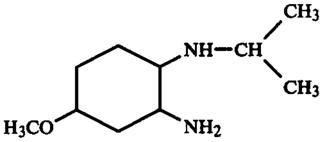 | 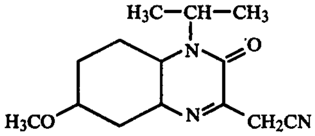 |

Table I-continued
| | I | II |
|---|---|---|
| No. | O-phenylenediamines | Quinoxaline compounds |
| 12 | 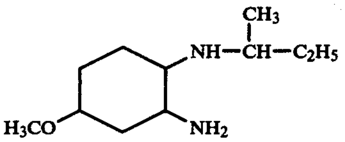 | 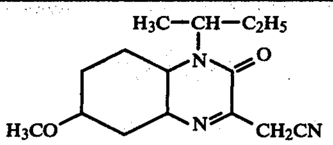 |
| 13 | 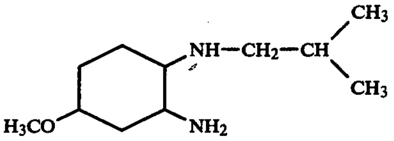 | 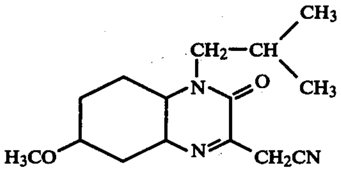 |
| 14 | 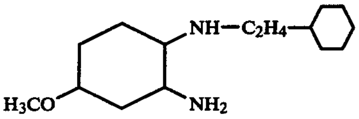 | 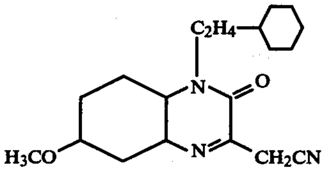 |
| 15 | 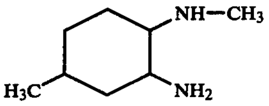 | 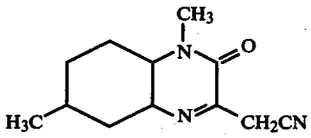 |
| 16 | 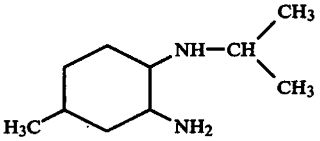 | 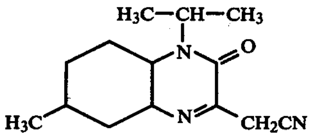 |
| 17 | 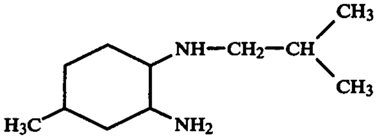 | 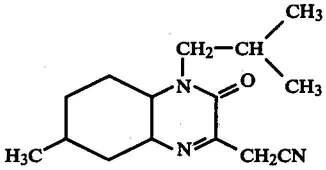 |
| 18 | 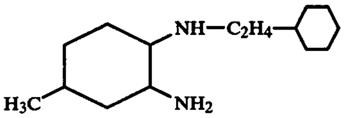 | 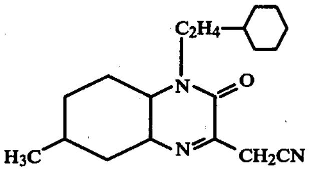 |
| 19 | 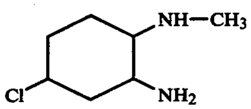 | 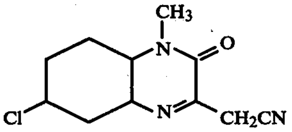 |
| 20 | 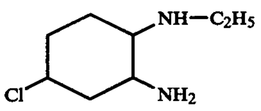 | 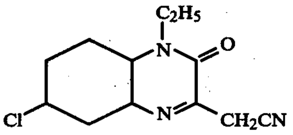 |
| 21 | 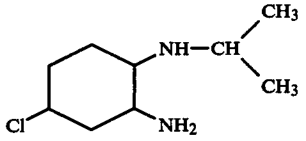 | 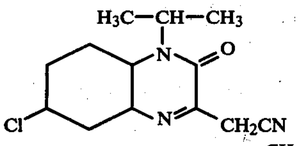 |
| 22 | 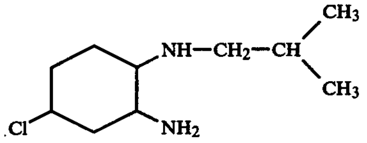 | 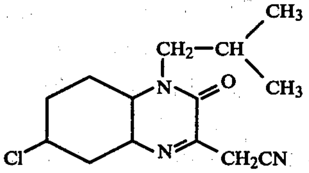 |

Table I-continued

| | I | II |
|---|---|---|
| No. | O-phenylenediamines | Quinoxaline compounds |
| 23 | 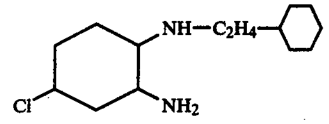 | 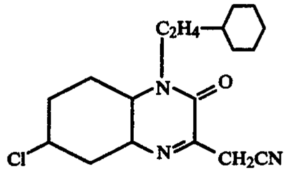 |
| 24 | 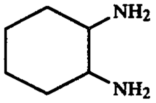 | 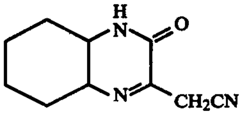 |

EXAMPLE 3

If the equivalent amounts of the naphthostyrils listed in the following Table II and I and of the quinoxaline compounds given under II are used, with the procedure being carried out otherwise as in Example 1, there are obtained the corresponding dyes shown in column III, which have properties similar to those of the dye of Example 1.

Table II

| | I | II | III | IV |
|---|---|---|---|---|
| No. | Naphthostyrins | Quinoxaline compounds | Dyes | Shade on PES |
| 1 | 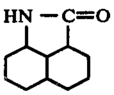 | 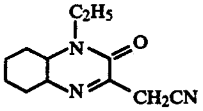 | 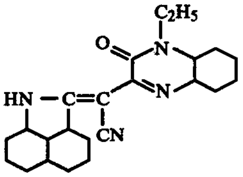 | red |
| 2 | " | 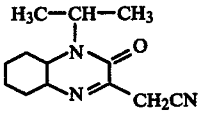 | 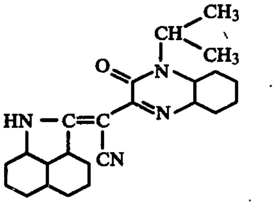 | " |
| 3 | " | 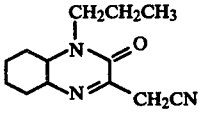 | 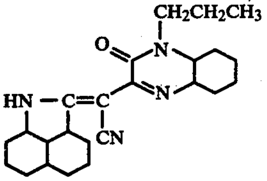 | " |
| 4 | " | 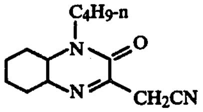 | 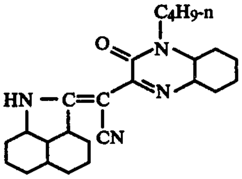 | " |
| 5 | " | 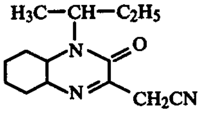 | 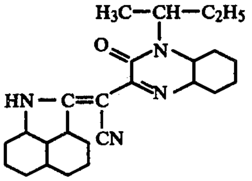 | " |
| 6 | " | 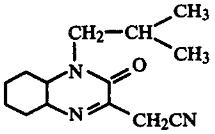 | 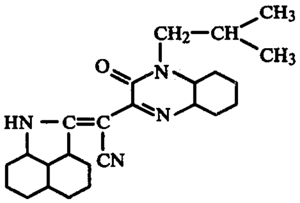 | " |

Table II-continued
| I | | II | III | IV |
|---|---|---|---|---|
| No. | Naphthostyrins | Quinoxaline compounds | Dyes | Shade on PES |
| 7 | ″ | 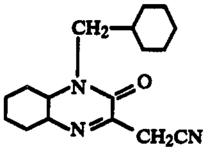 | 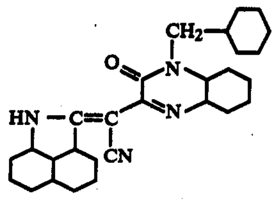 | ″ |
| 8 | ″ | 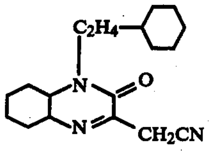 | 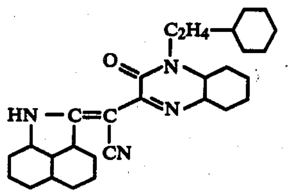 | ″ |
| 9 | ″ | 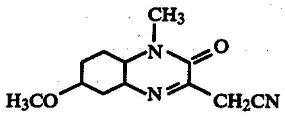 | 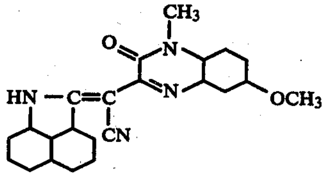 | ″ |
| 10 | ″ | 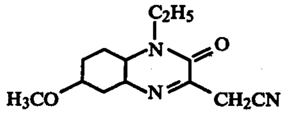 | 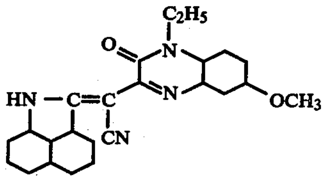 | ″ |
| 11 | ″ | 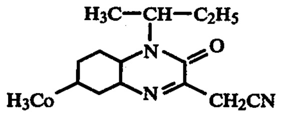 | 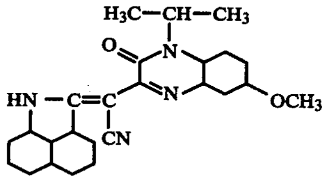 | ″ |
| 12 | ″ | 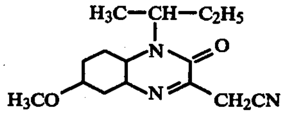 | 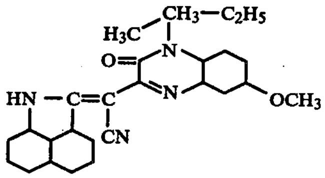 | ″ |
| 13 | ″ | 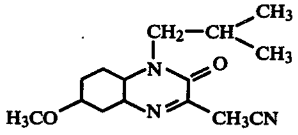 | 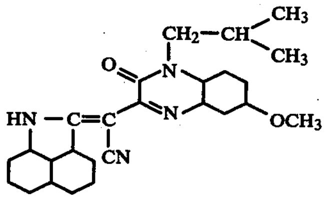 | ″ |
| 14 | ″ | 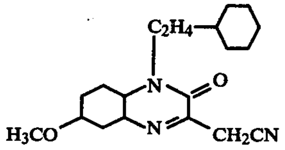 | 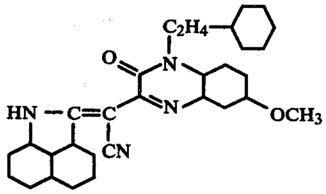 | ″ |

Table II-continued
| | I | II | III | IV |
|---|---|---|---|---|
| No. | Naphthostyrins | Quinoxaline compounds | Dyes | Shade on PES |
| 15 | " | 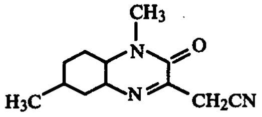 | 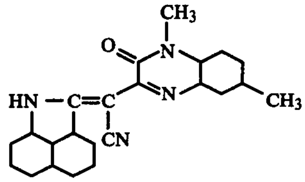 | " |
| 16 | " | 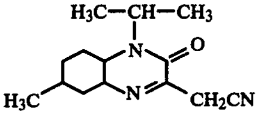 | 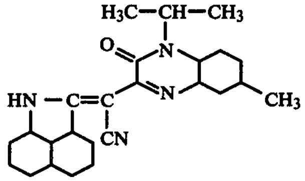 | " |
| 17 | " | 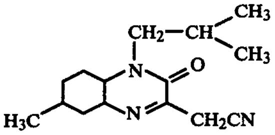 | 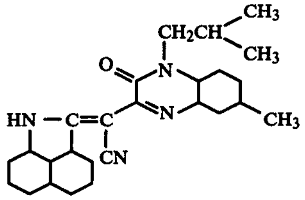 | " |
| 18 | " | 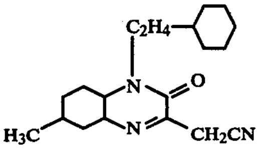 | 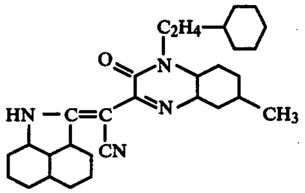 | " |
| 19 | " | 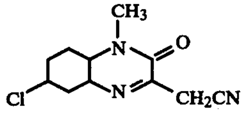 | 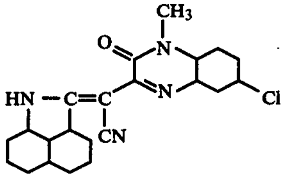 | " |
| 20 | " | 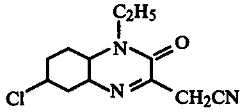 | 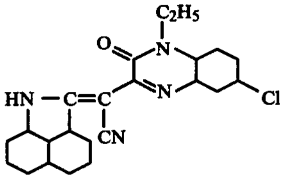 | " |
| 21 | " | 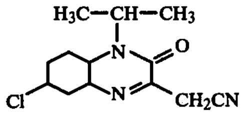 | 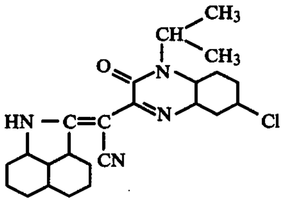 | " |
| 22 | " | 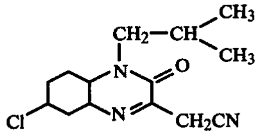 | 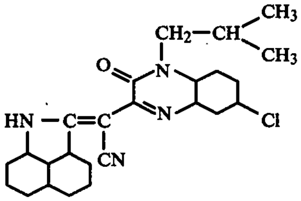 | " |

Table II-continued
| | I | II | III | IV |
|---|---|---|---|---|
| No. | Naphthostyrins | Quinoxaline compounds | Dyes | Shade on PES |
| 23 | " | 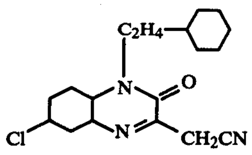 | 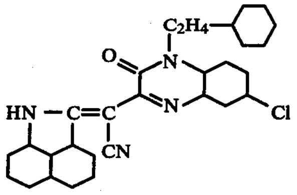 | " |
| 24 | 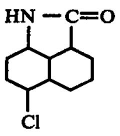 | 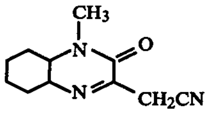 | 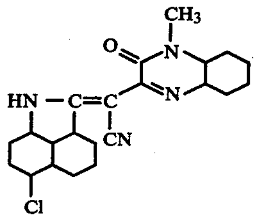 | " |
| 25 | 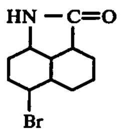 | 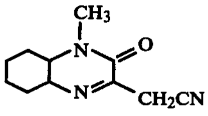 | 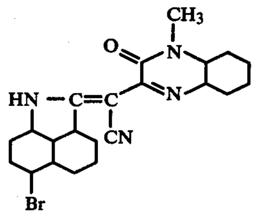 | " |
| 26 | 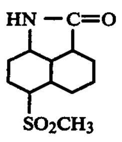 | " | 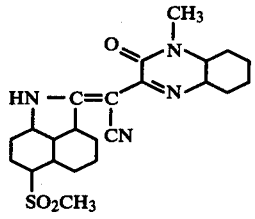 | " |
| 27 | 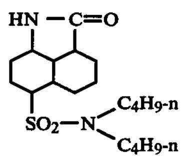 | " | 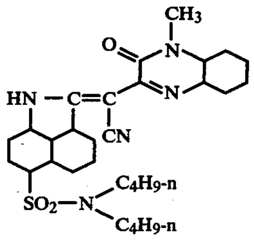 | " |
| 28 | 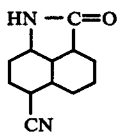 | " | 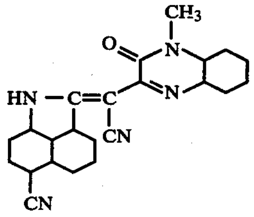 | " |
| 29 | 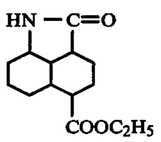 | " | 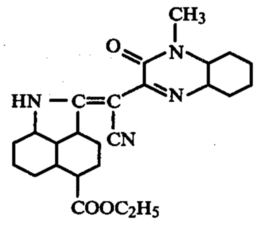 | red-violet |

Table II-continued
| No. | I Naphthostyrins | II Quinoxaline compounds | III Dyes | IV Shade on PES |
|---|---|---|---|---|
| 30 | 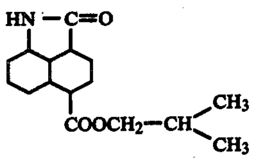 | ″ | 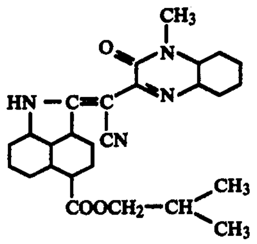 | red-violet |
| 31 | ″ | 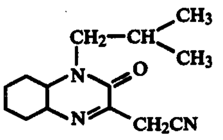 | 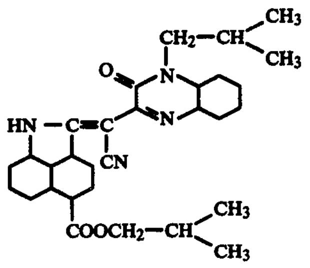 | red-violet |
| 32 | 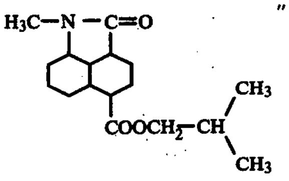 | ″ | 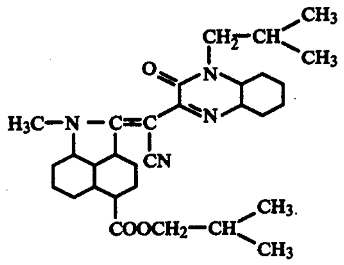 | ″ |
| 33 | 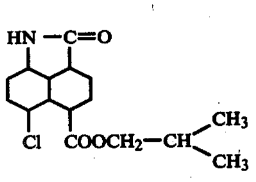 | 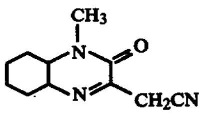 | 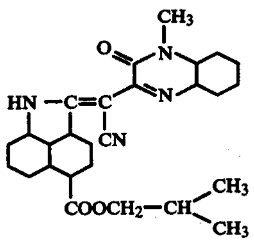 | red-violet |
| 34 | 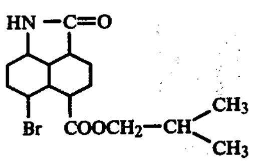 | 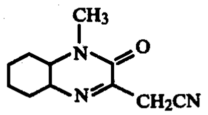 | 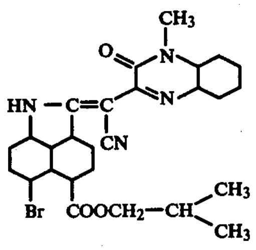 | red-violet |
| 35 | ″ | 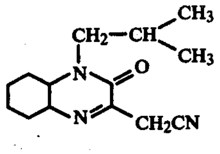 | 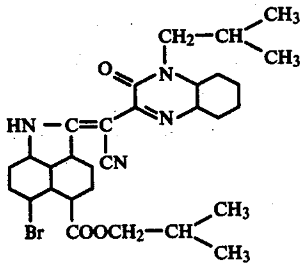 | ″ |

Table II-continued

| | I | II | III | IV |
|---|---|---|---|---|
| No. | Naphthostyrins | Quinoxaline compounds | Dyes | Shade on PES |
| 36 | 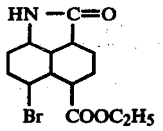 | 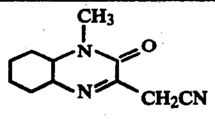 | 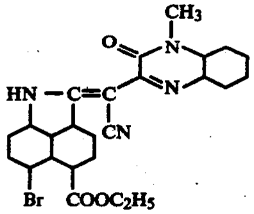 | " |
| 37 | 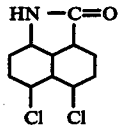 | 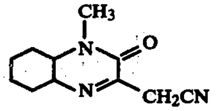 | 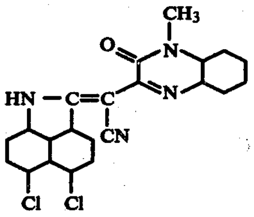 | red |
| 38 | 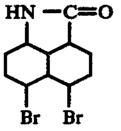 | " | 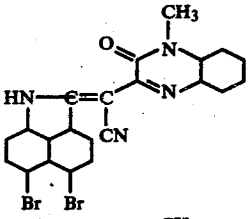 | " |
| 39 | 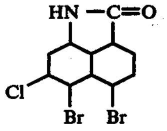 | " | 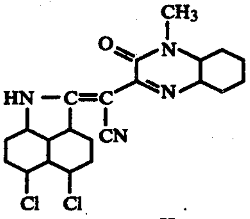 | " |
| 40 | 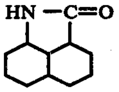 | 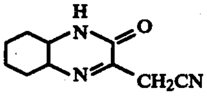 | 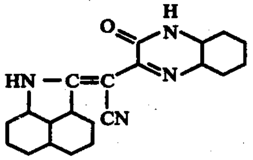 | red |

EXAMPLE 4

A mixture of 4.20 ml of phosphorus oxychloride and 6 ml of chlorobenzene is added dropwise at a temperature of 100°, within 30 minutes, to a mixture of 3.40 g of naphthostyril, 4.35 g of the compound of the formula

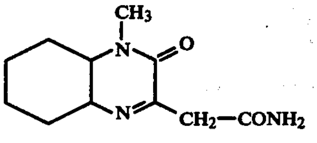

(obtained from the corresponding ethyl quinoxalyl acetate with ammonia gas at 125° in ethyl cellosolve as solvent) and 30 ml of chlorobenzene, and stirring is maintained for a further 2 hours at the same temperature. After cooling, the formed precipitate is filtered off and is converted into the dye in the manner described in Example 1. The dye obtained in this way has properties which are the same as those of the dye described in Example 1.

EXAMPLE 5

A mixture of 6.55 g of the compound of the formula

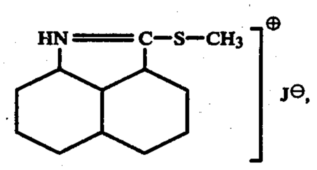

4.00 g of the compound of the formula

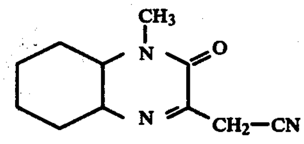

and 30 ml of pyridine is stirred for 2 hours at a temperature of 98° to 100°, and the mixture is then allowed to cool. The formed dye is filtered off and is washed first repeatedly with small amounts of pyridine, then with water and finally with methanol. On drying at 100° in vacuo, there is obtained a dye which proves to be identical to the dye of Example 1.

EXAMPLE 6

2 g of the dye obtained according to Example 1 is dispersed in 4000 g of water. To this dispersion are added as swelling agent 12 g of the sodium salt of o-phenylphenol and 12 g of diammonium phosphate, and 100 g of yarn from polyethylene glycol terephthalate is dyed therewith at 95° to 98° for 1½ hours. The dyeing is rinsed and aftertreated with aqueous sodium hydroxide solution and a dispersing agent. There is obtained in this way a red dyeing which is fast to washing, to light and to sublimation.

If in the above Example the 100 g of polyethylene glycol terephthalate is replaced by 100 g of cellulose triacetate fabric, with the material being dyed under the given conditions and subsequently rinsed with water, there is obtained a red dyeing having very good fastness to washing and to sublimation.

EXAMPLE 7

2 g of the dye obtained according to Example 1 is finely suspended in 2000 g of water containing 4 g of oleyl polyglycol ether in a pressure dyeing apparatus. The pH value of the dye bath is brought to 4 to 5 with actic acid. 100 g of polyethylene glycol terephthalate fabric is then introduced at 50°; the bath is heated within 30 minutes to 140°, and dyeing is performed for 50 minutes at this temperature. The dyeing is subsequently rinsed with water, soaped and dried. Under these conditions are obtained a red dyeing having fastness to washing, to perspiration, to light and to sublimation.

The dyes described in the other Examples yield in this process dyeings of equally high quality.

If in the above Example the 100 g of polyethylene glycol terephthalate is replaced by 100 g of cellulose triacetate fabric, with dyeing being performed under the given conditions and the material being subsequently rinsed with water, a red dyeing having very good fastness to light and to sublimation is obtained.

EXAMPLE 8

The dyeing according to Example 6 is repeated except that the dye used is a mixture of the dye obtained according to Example 1 and the dye of the formula

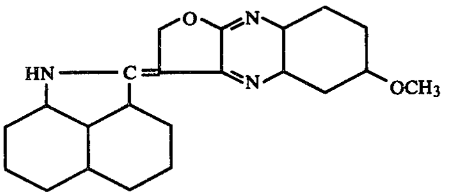

(weight ratio 1:1)

Red dyeings having good fastness properties are obtained.

The last-mentioned dye is obtained by mixing together equivalent amounts of naphtholactam and of the compound of the formula

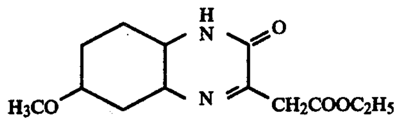

in chlorobenzene at 100°, and slowly adding phosphorus oxychloride.

We claim:

1. A dye of the formula

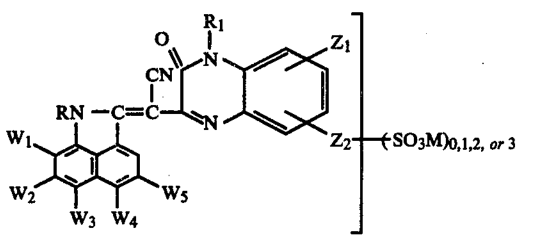

wherein

R is hydrogen, $C_1$–$C_8$-alkyl, $C_2$–$C_8$-alkenyl, cyclohexyl, benzyl, phenylethyl or phenyl, hydroxyalkyl having 2 or 3 carbon atoms, alkoxyalkyl having 3 to 8 carbon atoms, β-chloroethyl, β-cyanoethyl, alkoxycarbonylethyl having 1 to 4 carbon atoms in the alkoxy moiety, carbamoylethyl, N-monoalkyl- or N,N-dialkyl substituted carbamoylethyl having 1 to 4 carbon atoms in the alkyl moiety, $R_1$ is hydrogen, $C_1$–$C_8$-alkyl, $C_2$–$C_8$-alkenyl, cyclohexyl, benzyl or phenylethyl, $Z_1$ and $Z_2$ are hydrogen, $C_1$–$C_4$-alkyl, $C_1$–$C_4$-alkoxy, chlorine, bromine, fluorine, $C_1$–$C_4$-alkylmercapto, phenylmercapto, phenyl, phenoxy, cyano, nitro, trifluoromethyl, C–$C_4$-alkylsulphonyl, phenylsulphonyl, $C_1$–$C_5$-alkylcarbonylamino, cyano, chlorocarbonyl, carbonamide, carboxylic acid ester ($C_1$–$C_5$-alkyl), carboxylic acid hydrazide or sulphonamide, M is hydrogen, an alkali metal cation, or ammonium, $W_1$ is hydrogen, chlorine, bromine, $C_1$–$C_4$-alkyl, $C_1$–$C_4$-alkoxy, nitro or phenylmercapto, $W_2$ is hydrogen or chlorine, $W_3$ is hydrogen, chlorine, bromine, cyano, $C_1$–$C_4$-alkyl, $C_1$–$C_4$-alkoxy, nitro, $C_1$–$C_5$-alkylcarbonylamino, $C_1$–$C_6$-alkylsulphonylamino, phenylsulphonylamino, $C_1$–$C_6$-alkylmercapto, phenylmercapto, phenylsulphonyl, $C_1$–$C_6$-alkylsulphonyl, sulphonamide, N-alkylated sulphonamide having up to 8 C atoms, $C_2$–$C_6$-alkanoyl or benzoyl, $W_4$ is hydrogen, chlorine, bromine, $C_1$–$C_4$ -alkoxy, phenylmercapto, —CN, —COCl, or the COOH group or the COO—$C_1$–$C_8$-alkyl group, and $W_5$ is hydrogen, chlorine or $C_1$–$C_4$-alkoxy.

2. A dye according to claim 1, which dye corresponds to the formula

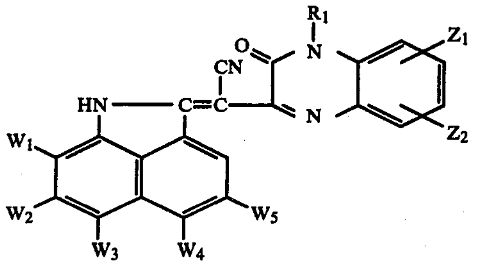

wherein $Z_1$, $Z_2$, $R_1$, $W_1$, $W_2$, $W_3$, $W_4$ and $W_5$ have the aforegiven meanings.

3. A dye according to claim 1, which corresponds to the formula

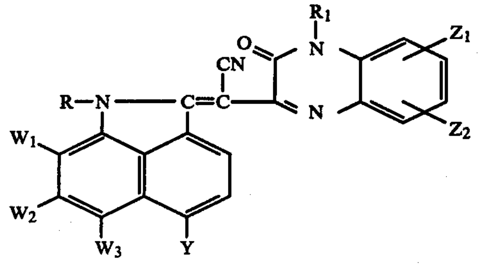

wherein

R, $R_1$, $Z_1$ and $Z_2$ have the aforegiven meanings, $W_1$ is hydrogen, chlorine, bromine, $C_1$-$C_4$-alkyl, $C_1$-$C_4$-alkoxy, or nitro, $W_2$ is hydrogen or chlorine, $W_3$ is hydrogen, chlorine, bromine, $C_1$-$C_4$-alkyl, $C_1$-$C_4$-alkoxy, nitro, $C_1$-$C_4$-alkylmercapto or $C_1$-$C_4$-alkylsulphonyl, sulphonamide or N-alkyl sulphonamide having up to 8 carbon atoms, and Y is —CN, —COCl, —COOH, COO—$C_1$-$C_4$-alkyl.

4. A dye according to claim 1, which dye corresponds to the formula

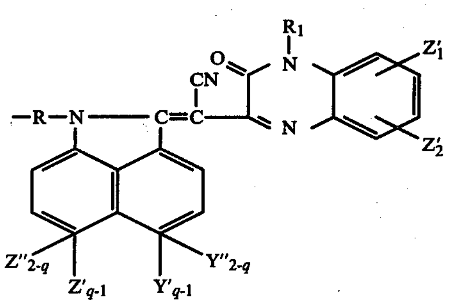

wherein

R has the aforegiven meaning, $R_1$ is lower alkyl or hydrogen,

Z' is hydrogen, chlorine or bromine,

Z'' is hydrogen, chlorine, bromine, —$SO_2$—$C_1$-$C_4$-alkyl, —$SO_2$— phenyl, —$SO_2$—N—($C_1$-$C_4$-alkyl)$_2$ and CN, Y' is COCl, COOH, COO—$C_1$-$C_4$-alkyl, Y'' is bromine, chlorine or hydrogen, and $Z_1'$ and $Z_2'$ are hydrogen, $C_1$-$C_4$-alkyl, $C_1$-$C_4$-alkoxy, chlorine, bromine, fluorine, $C_1$-$C_4$-alkylmercapto, phenyl, phenoxy, cyano, nitro or trifluoromethyl, and q is one or two.

5. A dye according to claim 1, wherein R is hydrogen or alkyl having 1 to 4 carbon atoms, alkenyl having 2 to 4 carbon atoms, hydroxyalkyl having 2 or 3 carbon atoms, alkoxyalkyl having 3 to 8 carbon atoms, β-chloroethyl, β-cyanoethyl, alkoxycarbonylethyl having 1 to 4 carbon atoms in the alkoxy moiety, carbamoylethyl, N-monoalkyl- or N,N-dialkylsubstituted carbamoylethyl having 1 to 4 carbon atoms in the alkyl moiety, cyclohexyl, benzyl, phenylethyl or phenyl, $R_1$, $W_1$, $W_2$, $W_3$, $W_4$ and $W_5$ have the aforegiven meanings, and the radicals $Z_1$ and $Z_2$ are hydrogen, $C_1$-$C_4$-alkyl, $C_1$-$C_4$-alkoxy, $C_1$-$C_4$-alkylmercapto, phenoxy, phenylmercapto, bromino, chlorine, nitro, $C_1$-$C_4$-alkylsulphonyl, phenylsulphonyl, $C_1$-$C_5$-alkylcarbonylamino, cyano, chlorocarbonyl, carbonamide, carboxylic acid ester ($C_1$-$C_5$-alkyl), carboxylic acid hydrazide or sulphanamide.

6. A dye according to claim 1, wherein

R is hydrogen or methyl, ethyl, propyl, butyl, hexyl, β-ethylhexyl, β-hydroxyethyl or β-hydroxypropyl, methoxyethyl, ethoxyethyl, methoxypropyl, ethoxypropyl, butoxypropyl, amyloxypropyl, methoxycarbonylethyl, ethoxycarbonylethyl, allyl, butoxycarbonylethyl or β-cyanoethyl, $R_1$ has the same meaning as in claim 1, and $Z_1$ and $Z_2$ are $C_1$-$C_4$-alkyl, $C_1$-$C_4$-alkoxy, fluorine, bromine, chlorine, $C_1$-$C_4$-alkylmercapto, $C_1$-$C_4$-alkylsulphonyl, phenylsulphonyl.

7. A dye according to claim 1 of the formula

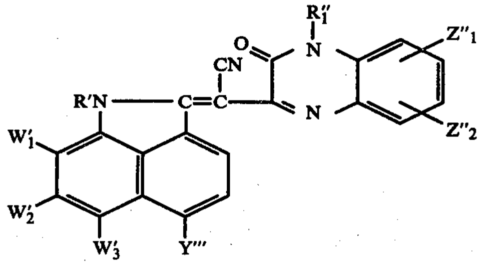

wherein

R' is lower alkyl or hydrogen, $R_1''$ is hydrogen, $C_1$-$C_4$-alkyl, benzyl, phenylethyl, $Z_1''$ and $Z_2''$ are hydrogen, $C_1$-$C_4$-alkyl, $C_1$-$C_4$-alkoxy, bromine or chlorine, $W_1'$ is hydrogen, chlorine or bromine, $W_2'$ is hydrogen or chlorine, $W_3'$ is hydrogen, chlorine, bromine, cyano or $SO_2$—$C_1$-$C_4$-alkyl, Y''' is hydrogen, chlorine, bromine or COO—$C_1$-$C_4$-alkyl.

8. A dye according to claim 1 of the formula

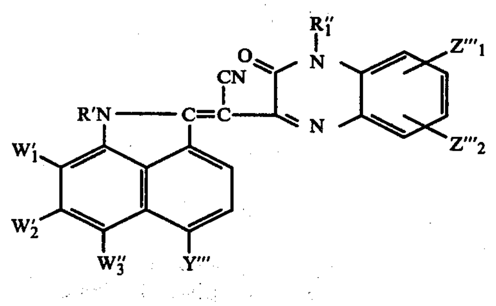

wherein

R' is hydrogen, $R_1''$ is hydrogen, $C_1$-$C_4$-alkyl, benzyl, phenylethyl, $W_1'$ is hydrogen, chlorine or bromine, $W_2'$ is hydrogen or chlorine, $W_3'$ is hydrogen, chlorine, bromine, cyano, $SO_2$—$C_1$-C-alkyl or $SO_2$—N—($C_1$-$C_4$-alkyl)$_2$, Y''' is hydrogen, chlorine, bromine or COO—$C_1$-$C_4$-alkyl, $Z_1'''$ is hydrogen, chlorine, bromine, cyano, $SO_2$—$C_1$-$C_4$-alkyl, and $Z_2'''$ is hydrogen.

9. A dye according to claim 1 of the formula

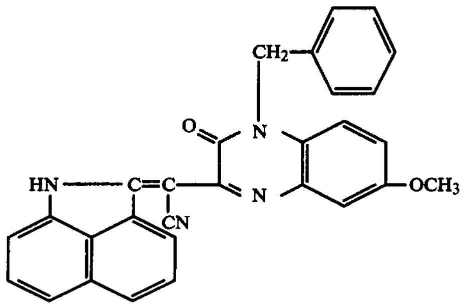

10. A dye as claimed in claim 1 of the formula

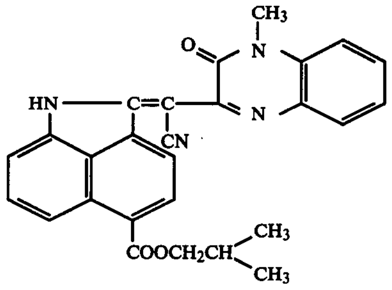

11. A dye according to claim 1, wherein $Z_1$ and $Z_2$ are hydrogen, $C_1$-$C_4$-alkyl, $C_1$-$C_4$-alkoxy, bromine or chlorine.

12. A dye according to claim 11, which corresponds to the formula

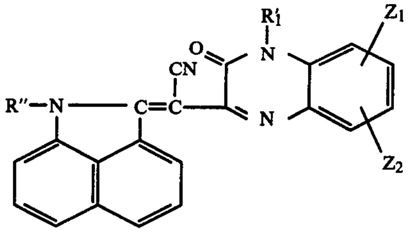

wherein $Z_1$ and $Z_2$ have the same meanings as in claim 11, R'' is hydrogen, and $R_1'$ is hydrogen or lower alkyl.

13. A dye as claimed in claim 12, of the formula

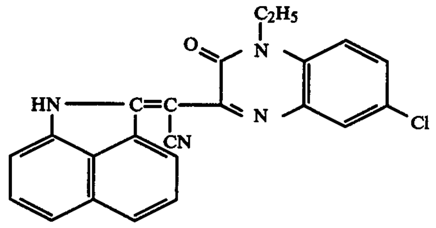

14. A dye as claimed in claim 12 of the formula

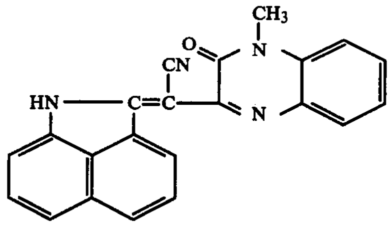

15. A dye according to claim 12 of the formula

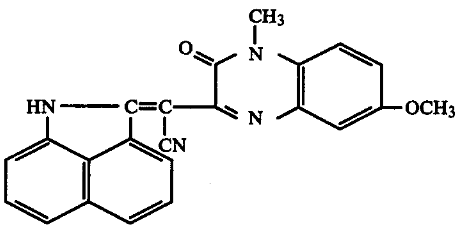

16. A dye according to claim 7, in which Y''' is COO—$C_1$-$C_4$-alkyl.

* * * * *